United States Patent [15] 3,697,615
Hughes [45] Oct. 10, 1972

[54] HYDROGENATION OF OLEFIN HYDROCARBONS USING RHODIUM OR IRIDIUM HALIDE COMPLEXES WITH METAL HALIDES

[72] Inventor: William B. Hughes, Bartlesville, Okla.

[73] Assignee: Phillips Petroleum Company

[22] Filed: Feb. 8, 1971

[21] Appl. No.: 113,614

[52] U.S. Cl. ........260/683.9, 252/429 R, 252/429 B, 252/431 P, 260/666 A, 260/677 H
[51] Int. Cl. ..........................C07c 5/02, C07c 11/00
[58] Field of Search ..........260/683.9, 666 A, 431 P, 429 B, 677 H; 252/431 P, 429 B, 429 R

[56] References Cited

UNITED STATES PATENTS

| | | |
|---|---|---|
| 3,210,296 | 10/1965 | Gray........................260/683.9 |
| 3,412,174 | 11/1968 | Kroll........................260/677 H |
| 3,487,112 | 12/1969 | Paulik et al.............252/431 P |
| 3,489,786 | 1/1970 | Dewhirst................260/683.9 |
| 3,511,885 | 5/1970 | Hughes...................260/666 A |
| 3,514,497 | 5/1970 | Hughes...................260/666 A |
| 3,558,517 | 1/1971 | Hughes et al. .........260/666 A |

Primary Examiner—Tobias E. Levow
Assistant Examiner—A. P. Demers
Attorney—Young & Quigg

[57] ABSTRACT

Olefin hydrocarbons are hydrogenated by contacting the feed olefin hydrocarbon with a catalyst which is an admixture of a rhodium or an iridium halide complex and an aluminum or boron halide.

10 Claims, No Drawings

HYDROGENATION OF OLEFIN HYDROCARBONS USING RHODIUM OR IRIDIUM HALIDE COMPLEXES WITH METAL HALIDES

BACKGROUND OF THE INVENTION

1. Field of the Invention

This invention relates to the hydrogenation of olefin hydrocarbons.

2. Description of the Prior Art

It is of value to the chemical industry to hydrogenate olefin hydrocarbons to paraffin hydrocarbons for a variety of reasons. Heretofore, various catalyst systems have been developed which effect the hydrogenation of olefins to the corresponding saturated compound or selectively hydrogenate polyenes to olefin material having a reduced number of double bonds in the hydrocarbon molecule.

OBJECTS OF THE INVENTION

It is an object of this invention to hydrogenate olefin hydrocarbons to other hydrocarbons having a reduced number of double bonds. It is a more specific object of the invention to hydrogenate olefin hydrocarbons to saturated hydrocarbons. Other objects and advantages of the invention will be apparent from the following summary of the invention, detailed description of the invention, examples and claims.

SUMMARY OF THE INVENTION

I have discovered that olefin hydrocarbons can be hydrogenated to hydrocarbons having a reduced number of double bonds in the hydrocarbon molecule by contacting the olefin hydrocarbons with a catalyst comprising a rhodium or iridium halide complex in admixture with an aluminum or boron halide compound.

DETAILED DESCRIPTION OF THE INVENTION

The rhodium halide complex of the catalyst of the invention can be represented by the formula $(R_3Q)_a(CO)_bMX$ wherein M is Rh or Ir, X is a halogen, Q is phosphorus or arsenic, R is a saturated aliphatic or aromatic hydrocarbon radical, each radical having from about one to about 20 carbon atoms per molecule, and including aralkyl and alkaryl radicals, $b$ is 0 or 1, and $a$ is 2 when $b$ is 1 and $a$ is 3 when $b$ is 0. Bridged rhodium or iridum halide complexes having the formula

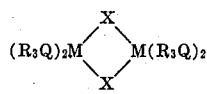

can also be used. In the above formula R, Q, M and X are the same as mentioned above. Mixtures can also be employed.

The aluminum or boron halide compounds of the catalyst can be represented by the formula $R'_eM'X_f$ wherein M' is aluminum or boron, X is a halogen, R' is an alkyl or cycloalkyl hydrocarbon radical having from one to about 20 carbon atoms, $e$ is 0 when M' is boron, or 0, 1 or 2 when M' is aluminum, and $f$ is 1, 2 or 3, the sum of $e$ and $f$ being 3. Included within the scope of the above formula are compounds having the formula $M'X_3$, $R_2AlX$, and $R_1AlX_2$ wherein M', X and R' are as defined above and mixtures of any of the above.

Although bromides, fluorides, chlorides and iodides can be used, the chloride compounds are generally preferred because of their availability and generally lower cost. These compounds and their method of preparation are well known in the art and many are commercially available.

Some non-limiting examples of the $R'_eM'X_f$ compounds include aluminum chloride, aluminum bromide, aluminum iodide, aluminum fluoride, boron trichloride, boron triiodide, ethylaluminum dichloride, methylaluminum dibromide, eicosylaluminum dichloride, cyclohexylaluminum difluoride, diethylaluminum chloride, methylaluminum sesquichloride, and the like. Those compounds having the formula $M'X_3$ are generally preferred because of lower cost. In addition, silver tetrafluoroborate or silver tetraphenylborate can be used instead of the $R_eM'X_f$ compounds.

Some non-limiting examples of the above-described rhodium or halide complexes which can be used include, bis(triphenylphosphine)-carbonylchlororhodium, bis(triphenylarsine)carbonylchlororhodium, bis(tributylphosphine)carbonylchlororhodium, bis[tri(p-xylyl)phosphine]carbonylfluororhodium, bis(tribenzylarsine)carbonylbromorhodium, bis(trimethylarsine)-carbonylchlororhodium, tris(trimethylphosphine)bromorhodium, bis(tribenzylarsine)-carbonylchlororhodium, bis(trieicosylphosphine)carbonylchlororhodium, bis-(methyldiphenylphosphine)carbonylchlororhodium, bis(dimethylphenylarsine)-carbonylchlororhodium, bis(tributylphosphine)(triphenylphosphine)iodorhodium, di-$\mu$-chloro-tetrakis(tributylarsine)dirhodium, di-$\mu$-iodo-tetrakis(triphenyl-phosphine)dirhodium, di-$\mu$-bromo-tetrakis(methyldiphenylphosphine)dirhodium, and the like, or mixtures thereof. In the above examples, the rhodium metal can be replaced with iridium metal to provide non-limiting examples of iridium complexes. Of course, mixtures of the above rhodium and iridium halide complexes can be used. The rhodium or iridium halide complexes can be prepared by any suitable method known in the art, and in some instances, these materials are commercially available.

The components of the catalyst are generally combined in a ratio in the range of about 1:1 to about 0.01:1 of the rhodium or iridium halide complex to the aluminum or boron halide.

The catalyst is prepared simply by combining the components for a sufficient time to and under conditions which permit the catalytically active composition to be formed. In general, the catalyst components are combined at a temperature of from 0°–75° C, preferably room temperature for the sake of convenience, for a period of time of from a few seconds to several hours. Generally, the active catalyst is present after a period in the range of about 0.1 to 3 hours of intimate contact of the components. The components are readily combined in a diluent in which both components are at least partially soluble. Suitable diluents include aromatic hydrocarbons, and aromatic or saturated aliphatic halides which are inert with respect to the formed catalyst; such as chlorobenzene, methylene chloride, benzene, toluene, cumene, fluorobenzene, perchloroethane, chloroform, and the like. After catalyst formation in the suitable diluent, the catalyst need not be isolated but can be added directly into the reaction zone in its dispersion agent. If desired, the catalyst can be prepared in the reaction zone by the combination, in any order, of the components in a diluent, either in the presence or absence of the olefin to be hydrogenated.

The hydrogenation reaction can take place in any suitable reaction zone at a temperature in the range of from about 0° C to about 150° C, but temperatures in the range of from about 20° to 90° C are preferred for convenience. The amount of hydrogen employed is in the range of from about 0.1 to about 100 moles of $H_2$ per mole of double bond equivalent olefin feed. The reaction pressure can range from about 0 to about 1,000 psig. Preferably, the pressure is in the range of about 200 to about 500 psig. The reaction period can be varied over a broad range from a few minutes to several hours, preferably from about 1 to about 24 hours; however, periods of from about 3 to about 8 hours are generally sufficient for maximum conversions. The proportion of catalyst composition to feed olefin in the reaction zone will vary widely depending upon the rate of reaction desired, but generally will be in the range of from about 0.001 to about 0.1 mole of rhodium or iridium complex per mole of olefin feed.

The hydrogenation reaction is simply carried out by admitting the hydrogen, if not present during the catalyst preparation, and the olefin hydrocarbon to the reaction zone under the above-mentioned conditions. Subsequent to completion of the reactions, the product paraffins and olefins, as well as the catalyst and solvent can be separated by suitable techniques such as fractionation, extraction, and the like. Unconverted feed materials can be recycled. Any suitable contacting technique can be employed for the olefin hydrogenation process and batchwise or continuous operation can be utilized.

The olefins which are capable of being hydrogenated according to the process of the invention include any hydrocarbon compound having terminal or internal ethylene unsaturation and/or acetylene unsaturation which is capable of adding hydrogen to the carbon atoms of the multiple bond(s). Of particular usefulness because of their commercial importance are acyclic or cyclic compounds each containing at least one carbon-carbon multiple bond and having from three to 30 carbon atoms per molecule, including cycloalkyl or aryl derivatives thereof. Some suitable examples of these olefins include 2-butene, 1-butene, 1-pentene, 1-hexene, 2-octene, 3-heptene, 1,6-heptadiene, 1,8-decadiene, butadiene, piperylene, allylbenzene, beta-methyl styrene, 1,5-cyclooctadiene, 1,5,9-cyclododecatriene, cyclooctene, cyclododecene, 2-butyne, 2,5-dimethyl-3-hexyne, 1,3-hexadiene-5-yne, cyclooctyne, and the like, or a mixture of such olefins. The invention process can also be performed on mixed olefin feed stocks such as those which are commonly found in refinery and other petrochemical processes.

The above described invention is illustrated by the following examples. The data provided in the examples is for the purpose of illustration and should not be construed to unduly limit the scope of the invention as previously defined.

EXAMPLE I

Olefin hydrocarbons were hydrogenated in the presence of a catalyst comprising a complex of $(Ph_3As)_2Co.RhCl$ and aluminum chloride cocatalyst. As control runs, one run was made without any cocatalyst and another run was made using $FeCl_3$ as the cocatalyst.

In each run, the rhodium halide complex and the metal halide, if any, were added to 20 ml. of diluent and stirred under nitrogen at room temperature for a period of 0.5 hours. In certain runs, as indicated below, the olefin was introduced along with the catalyst components. In certain other runs the olefin was not introduced to the reaction mixture until after the catalyst formation period.

After addition of the olefin, if not initially present, hydrogen was admitted to the reactor until the pressure was 100 psig. The reactor and contents were then brought to the reaction temperature and hydrogen was added until the pressure was 300 psig. The 300 psig pressure was maintained by addition of hydrogen as needed throughout the reaction period of 4 hours. The reactor effluent was then analyzed by gas-liquid chromatography for reaction products having the same number of carbon atoms as the feed olefin. Although the products were not analyzed to determine whether heavier compounds were formed, the production of sig-

TABLE I

Catalysts: (A) $(Ph_3As)_2(CO)RhCl$; (B) Cocatalyst

| Run No. | Cocat-alyst | G.(A)/G.(B) | Molar ratio A/B | Olefin | Olefin, g. | Olefin, mole | Molar ratio (A)/olefin | Diluent | Temp., °C. | Conv., Percent | Product analysis, wt. percent | |
|---|---|---|---|---|---|---|---|---|---|---|---|---|
| 1 | AlCl₃ | 0.12/0.08 | 0.256 | 1-hexene | 3.37 | 0.0401 | 0.00384 | Chlorobenzene | 50 | 100 | n-Hexane | 100.0 |
| 2 | AlCl₃ | 0.12/0.08 | 0.256 | do | ᵃ3.50 | 0.0417 | 0.00370 | do | 50 | 100 | do | 100.0 |
| 3 | AlCl₃ | 0.12/0.08 | 0.256 | do | 3.47 | 0.0413 | 0.00373 | do | 50 | 98.7 | n-Hexane / Hexene isomers | 98.7 / 1.3 |
| 4 | AlCl₃ | 0.18/08 | 0.385 | do | ᵃ3.50 | 0.0417 | 0.00540 | Benzene | 50 | 92.6 | n-Hexane / Hexene isomers | 92.6 / 7.3 |
| 5 | AlCl₃ | 0.35/0.33 | 0.181 | do | ᵃ3.45 | 0.0411 | 0.0107 | do | 85 | 88.0 | n-Hexane / Hexene isomers | 88.0 / 12.0 |
| 6 | None | 0.12/0.00 | | do | ᵃ3.46 | 0.0412 | 0.00375 | Chlorobenzene | 50 | 5.0 | n-Hexane / Hexene isomers | 5.0 / 95.0 |
| 7 | FeCl₃ | 0.19/.08 | 0.493 | do | 3.57 | 0.0425 | 0.00560 | Benzene | 50 | (ᶠ) | n-Hexane / Hexene isomers | Trace / 100.0 |
| 8 | AlCl₃ | 0.12/0.08 | 0.256 | CDTᵇ | 3.40 | 0.0210 | 0.00733 | Chlorobenzene | 50 | 22.7 | CDTᵇ / CDDᶜ / CDEᵈ / CDAᵉ | 77.2 / 18.6 / 4.1 / 0.0 |
| 9 | AlCl₃ | 0.12/0.08 | 0.256 | CDTᵃ | 4.03 | 0.0249 | 0.00619 | Benzene | 50 | 4.0 CDD | CDT / CDD / CDE / CDA | 96.0 / 4.0 / 0.0 / 0.0 |

ᵃ The olefin was introduced after the catalyst formation period.
ᵇ 1,5,9-cyclododecatriene
ᶜ Cyclododecadiene
ᵈ Cyclododecene
ᵉ Cyclododecane
ᶠ Negligible.

nificant amounts of heavy hydrocarbons was not apparent.

The specific conditions of the runs and the results are summarized in Table I.

The above runs demonstrate that the rhodium halide-aluminum chloride catalyst system is capable of hydrogenating 1-hexene to normal hexane and 1,5,9-cyclododecatriene to cyclododecadiene and cyclododecene. Run 6 demonstrates the aluminum chloride cocatalyst must be present to provide significant conversion of the olefin to the corresponding paraffin. Runs 1, 3 and 8 demonstrate that the feed olefin hydrocarbon can be present during the catalyst formation period without adversely affecting the reaction.

EXAMPLE II

Two additional runs were carried out wherein 1-hexene was hydrogenated in the presence of a catalyst comprising (Ph$_3$As)$_2$(CO)RhCl and silver fluoroborate.

In both runs, the rhodium halide complex and the silver fluoroborate were added to 20 ml. of chlorobenzene (diluent) and stirred under nitrogen at room temperature for a period of 0.5 hours. During this period a gray precipitate was observed which presumably was silver chloride. In Run 10, the precipitate was observed to be darker in color and more volumous than in Run 11. This was apparently caused by the use of larger amounts of AgBF$_4$ in Run 10.

After addition of the 1-hexene, hydrogen was admitted to the reactor until the pressure was 200 psig. The reactor and contents were then brought to reaction temperature and maintained there for 4 hours without further addition of hydrogen. The reactor effluent was then analyzed by gas-liquid chromatography. Although the products were not analyzed to determine whether heavy or polymeric products were formed, the production of significant amounts of heavy hydrocarbons was not apparent. The results of these runs are summarized in Table II.

or acetylenic hydrocarbon in the presence of hydrogen under hydrogenation conditions with a catalyst comprising an admixture of (a) a rhodium or iridium halide complex represented by the formula:

(1)

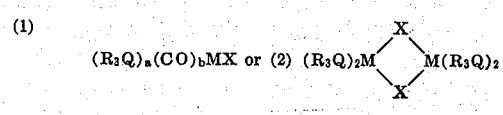

wherein M is rhodium or iridium, X is a halogen, Q is phosphorus or arsenic, R is a saturated aliphatic or aromatic hydrocarbon radical having from one to about 20 carbon atoms per molecule, including aralkyl and alkaryl radicals, and $b$ is 0 or 1, and $a$ is 2 when $b$ is 1, and $a$ is 3 when $b$ is 0; and (b) an aluminum or boron compound which is (1) represented by the formula R'$_e$M'X$_f$ wherein M' is aluminum or boron and X is a halogen and R' is an alkyl or cycloalkyl radical having from one to about 20 carbon atoms, $e$ is 0 when M' is boron, or 0, 1, or 2 when M' is aluminum, and $f$ is 1, 2, or 3, the sum of $e$ and $f$ being 3, or (2) silver tetrafluorborate or silver tetraphenylborate.

2. The process of claim 1 wherein the hydrogenation reaction is accomplished in the presence of an inert diluent in which both (a) and (b) are at least partially soluble.

3. The process of claim 1 wherein the olefin hydrocarbon is an acyclic and cyclic mono- or polyene having from about three to about 30 carbon atoms per molecule.

4. The process of claim 1 wherein the molar ratio of (a) to (b) is in the range of from about 1:1 to about 0.01:1.

5. The process of claim 1 wherein the hydrogenation conditions include a temperature in the range of from about 0° to about 150° C, the pressure is in the range of from about 0 to about 1,000 psig and the reaction time is in the range of from about 1 to about 24 hours.

6. The process of claim 1 wherein the rhodium or iridium halide complex is (1).

7. The process of claim 6 wherein Q is arsenic, M is Rh, $a$ is 2 and $b$ is 1.

8. The process of claim 2 wherein the solvent is

TABLE II

Catalysts: (A) (Ph$_3$As)$_2$(CO)RhCl; (B) AgBF$_4$

| Run No. | G. (A)/ (B) | Molar ratio A/B | Olefin Compound | G. | Mole | Molar ratio A/olefin | Diluent | Temp., °C. | Conversion, wt. percent | Product analysis, wt. percent | |
|---|---|---|---|---|---|---|---|---|---|---|---|
| 10 | 0.12/0.12 | 0.250 | 1-hexene | 3.46 | 0.041 | 0.00375 | Chlorobenzene | 50–64 | 100 | n-Hexane | 100.0 |
| 11 | 0.26/0.07 | 0.930 | do | 3.46 | 0.041 | 0.00812 | do | 27–58 | 100 | do | 100.0 |

Reasonable variation and modifications of the invention as described herein will be apparent to one having skill in the art without departing from the spirit and scope of the invention.

I claim:

1. A process for hydrogenating olefinic or acetylenic hydrocarbons which comprises contacting said olefin chlorobenzene or benzene.

9. The process of claim 8 wherein the olefin hydrocarbon is 1-hexene or 1,5,9-cyclododecatriene.

10. The process of claim 9 wherein the catalyst is an admixture of bis(triphenylarsine)carbonylchlororhodium and aluminum chloride or silver fluoroborate.

* * * * *